US006375771B1

(12) United States Patent
Bright

(10) Patent No.: US 6,375,771 B1
(45) Date of Patent: *Apr. 23, 2002

(54) APPLYING STRETCH LABELS

(75) Inventor: Lyn E. Bright, Ceres, CA (US)

(73) Assignee: B & H Manufacturing Company, Inc., Ceres, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/761,231

(22) Filed: Dec. 6, 1996

Related U.S. Application Data

(63) Continuation of application No. 08/495,982, filed on Jun. 28, 1995, now abandoned.

(51) Int. Cl.[7] .......................... B32B 31/12; B65C 9/00

(52) U.S. Cl. ........................ 156/86; 156/215; 156/229; 156/256; 156/DIG. 9

(58) Field of Search ............................... 156/215, 218, 156/86, 229, 446, 448, 449, 450, 456, 521, DIG. 9, DIG. 10, DIG. 11, DIG. 12, DIG. 13, 256

(56) References Cited

U.S. PATENT DOCUMENTS

| | | | | | |
|---|---|---|---|---|---|
| 3,235,433 | A | | 2/1966 | Cvacho et al. | 156/229 |
| 4,108,709 | A | * | 8/1978 | Hoffmann | 156/458 X |
| 4,216,044 | A | * | 8/1980 | Herdzina et al. | 156/448 X |
| 4,416,714 | A | | 11/1983 | Hoffmann | 156/86 |
| 4,923,557 | A | * | 5/1990 | Dickey | 156/456 X |
| 5,091,239 | A | * | 2/1992 | Przeworski et al. | 156/218 X |
| 5,289,671 | A | | 3/1994 | Lerner et al. | |
| 5,311,725 | A | | 5/1994 | Martin et al. | |
| 5,741,381 | A | * | 4/1998 | Dolence et al. | 156/64 |
| 5,858,143 | A | * | 1/1999 | Bright et al. | 156/86 |
| 6,245,181 | B1 | * | 6/2001 | Bright | 156/215 |

FOREIGN PATENT DOCUMENTS

WO WO 94/14611 7/1994

* cited by examiner

*Primary Examiner*—Curtis Mayes
(74) *Attorney, Agent, or Firm*—LaRiviere, Grubman & Payne, LLP

(57) ABSTRACT

Method of applying elastic material or the like to containers or the like wherein the labels are in stretched condition as they are applied to a container, the container being caused to move and/or to spin to wrap the label around it. Also articles so labeled.

14 Claims, 4 Drawing Sheets

APPLYING STRETCH LABELS

CROSS REFERENCE TO RELATED APPLICATIONS

This is a continuation of U.S. patent application Ser. No. 08/495,982 filed Jun. 28, 1995, now abandoned.

BACKGROUND OF THE INVENTION

This invention relates to applying stretch labels to containers and other articles. It is common practice to apply labels to containers and other articles by supplying a continuous length of label material from a roll, cutting it into suitable lengths which are transferred to a rotating vacuum drum which picks up each label in turn on its cylindrical surface by means of vacuum and transports each label to a label applying station where it is wrapped around a container. For the purpose of adhering the label to the container, glue is applied to the container and/or to the label, usually the latter, at its leading end and at its trailing end. An adhesive may be formed in situ by the use of a solvent. Also, heat sealing of the overlap between the trailing end of the label of the leading end of the label may be employed.

Hereinbelow for convenience the term "label" or "labels" and the term "container" will be used, but it is to be understood that other segments of sheet material may be applied, e.g., for decorative purposes and that other articles than containers may have labels or other segments of sheet material applied to them.

Such label application to containers may be carried out with a stack of precut labels rather than severing labels from a continuous length of label material.

Representative patents relating to such label application are U.S. Pat. Nos. 4,108,709; 4,108,710; 4,500,386; 5,091,040; 5,137,596 and 5,269,864. Such label application may also be carried out and is often carried out with a heat shrinkable label material which, after application to the container, is subjected to heat to cause it to shrink, e.g., into a recessed area of a container or onto contoured portions such as the neck or shoulder of a container. For example, in U.S. Pat. No. 4,704,173, such heat shrink labeling is illustrated by application of a label to a container having a cylindrical body above and below which are portions of the container which are of lesser diameter. The heat shrinking shrinks the label onto such areas of lesser diameter.

An alternative to such heat shrinking/contour labeling is the application of stretchable labels, which are stretched before application and which, after application, contract and closely adhere to the recessed and/or contoured portions of the container. An example of such stretch labeling and the method and machinery for accomplishing it is provided by Automatic Label Systems of Twinsburg, Ohio, who supply what are called "Auto-Sleeve® stretch sleeve labels." By The Auto-Sleeve® labels are first formed into sleeves. The sleeves have a diameter less than the maximum diameter of the container to which they are to be fitted and the sleeve is stretch fitted over the container and when so applied it contracts and relaxes to fit the container tightly. This method avoids the need to use glue, heat or solvent to adhere the label to containers and it avoids the need to heat the label on containers to shrink the label material onto the container.

However, that method requires first forming the stretch label material into a sleeve, then fitting the sleeve over the. container.

OBJECTS OF THE INVENTION

It is an object of the present invention to provide a method and machinery which will apply stretch labels in sheet form, as for example in U.S. Pat. No. 4,500,386 or U.S. Pat. No. 4,108,709, and to apply the labels in stretched condition without the need to preform a sleeve.

The above and other objects will be apparent from the ensuing description the appended claims.

SUMMARY OF THE INVENTION

In accordance with the invention stretch label material, e.g., stretchable polyethylene is supplied continuously to a cutting instrumentality such as that shown in U.S. Pat. No. 4,181,555 and each label, after it passes through the cutter and before it is cut into an individual label is supplied to a rotating vacuum drum and its leading end is placed on the rotating vacuum drum, which grips the label by vacuum. Alternatively, but less desirably, precut labels are fed from a stack of the same to a vacuum drum, as for example in U.S. Pat. No. 4,978,416, likewise being gripped by the vacuum of the vacuum drum. In either case the peripheral speed of the drum exceeds the linear speed of the label. In the absence of a sufficiently high vacuum this would lead to slippage of the label on the drum. However, by using a sufficiently high vacuum this is avoided. Hence the label is held firmly on the drum by vacuum and by reason of the fact that the peripheral speed of the drum is greater than that of the label feed through the cutting instrumentality, the label is stretched.

Alternatively the leading end of the label may be clamped onto the vacuum drum, e.g., as described in Eder U.S. Pat. No. 5,116,452. The combined use of a clamp and a vacuum strong enough to hold the label against slippage may also be employed.

The label thus held in stretched condition on the drum is then contacted, e.g., at the leading end and at the trailing end by a glue applicator which applies glue to the leading end and to the trailing end so that when the label is wrapped around the container it is adhered thereto. Also the use of a solvent applied to the label and absorbed by the label to form an adhesive in situ may be employed. Alternatively, also heat sealing of the ends of the label together may be accomplished as for example in U.S. Pat. No. 5,137,596.

The problem of relaxation of the label from its stretched condition when it is released from the vacuum drum may be dealt with as follows: The adhesive applied to the leading end of the label to adhere it to the container may be an adhesive which bonds very quickly and strongly to the label and to the container, such that it prevents or minimizes relaxation of the label as it leaves the vacuum drum and bonds to the container. Suitable adhesives are National 4000, a product of National Starch Co. Of Chicago, Ill. and Century 7002, a product of Century Adhesives, of Columbus, Ohio. Alternatively, or in conjunction with the use of such as adhesive, the adhesive may be applied as a series of dots spaced lengthwise along the label or around the periphery of a container. Thus the first dot or array of dots of adhesive near the leading end of the label will be followed by a dot or array of dots spaced a short distance from the first dot or array, etc. Therefore the label will be held firmly on the container as each segment comes off of the vacuum drum and it is prevented from relaxing or the relaxation of the label is not significant.

Adhesive may be applied to the container rather than the label or it may be applied to both the container and the label. In U.S. Pat. No. 3,834,963, adhesive application to the container is shown. The adhesive application to the container may be (as in U.S. Pat. No. 3,834,963) applied to both the container and label, and the pattern of adhesive applied to the container may vary. For example, a line of adhesive may be applied to the container for adhesion to the leading end of the label, or it may be applied both to the leading end and to the trailing ends of the label, or it may be applied to the entire circumference of the container as a succession of dots.

Hereinabove, "dots" of adhesive have been referred to and as stated in connection with application to the label, adhesive may be applied as bands or strips to the container and/or to the label.

The labeled container is then removed from the label applying equipment. That portion or those portions of the stretched label overlying a recessed surface or surfaces of the container will shrink onto the recessed portion or portions.

If there is a recessed area on the container which is of a magnitude such that the relaxation of the label will not suffice, e.g., in the case of a deep groove in a container intended as a fingerhold, a heat shrinkable label may be employed, assisted if need be by perforations overlying such deeply recessed area or areas to release air trapped between the label and the container. Heat is applied to shrink the label onto ro into such deeply recessed area or areas.

Instead of employing a greater peripheral speed of the vacuum drum to stretch the label, the container may be caused to spin at a peripheral speed which is greater than that of the vacuum drum, thereby stretching the label. The peripheral speed of the container is the composite of the speed at which it is caused to spin, its diameter and the speed at which it travels after first making contact with the label. The difference in speed of the label while on the drum and this composite speed can be governed quite precisely by gears or by computer controlled motors as described below. To prevent the label from slipping on the container due to its greater peripheral speed, an adhesive which bonds strongly and quickly may be used. Alternatively (and/or in addition to such procedure), adhesive may be applied as a succession of dots so that the label is adhered to the container, not at one point but at several points.

The label may also be stretched by both procedures, that is by operating the vacuum drum at a peripheral speed greater than the label feed and by also causing the container to spin more at a composite speed greater than the peripheral speed of the vacuum drum.

BRIEF DESCRIPTION OF THE DRAWINGS

The accompanying figures, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
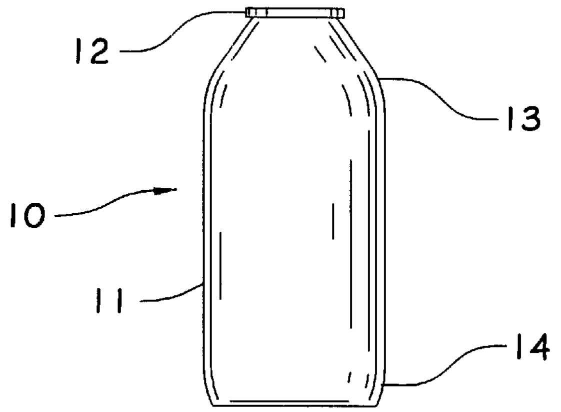
FIG. 1 is a view of a container which can be labeled by the method and with the apparatus of the present invention.

Referring now to FIG. 1, a container is shown at 10 which has a cylindrical body 11, a top 12 and a sloping neck or shoulder 13. This container is labeled as described below.

Figure 2:
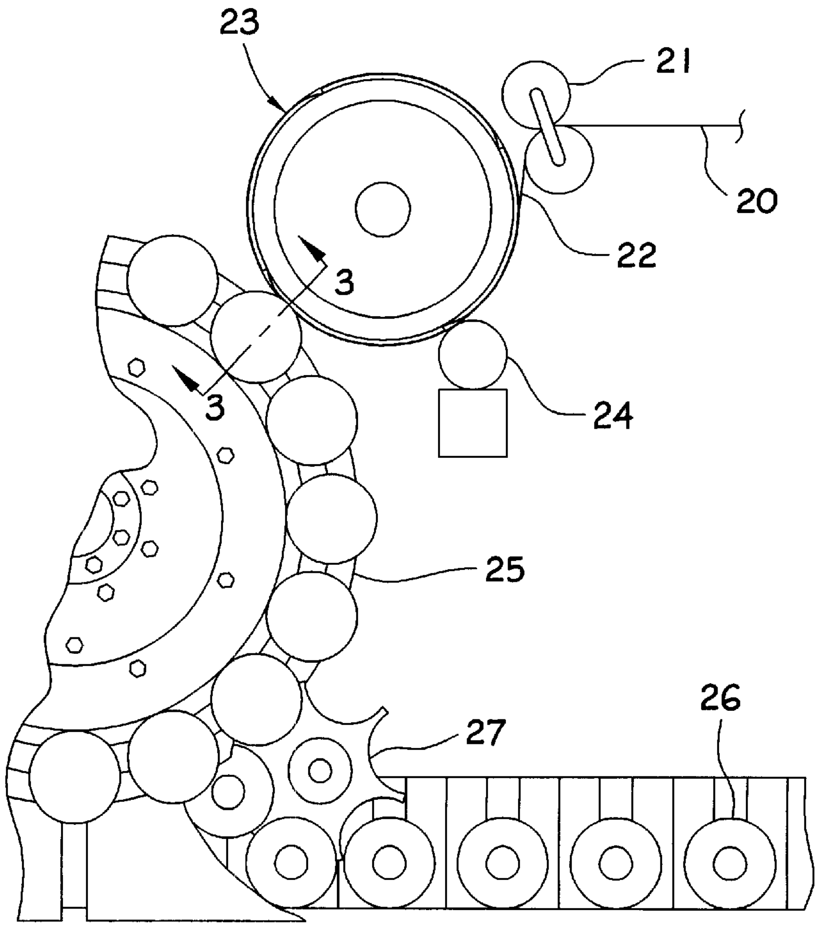
FIG. 2 is a top plan view of a label applying machine suited for use in the present invention.

Referring now to FIG. 2, which is taken from FIG. 1 of U.S. Pat. No. 4,108,709, but is simplified, continuous label stock 20 from a roll of such stock and a label feed (not shown) passes through a cutter 21 which severs the label stock into individual labels 22. Before a label is severed from the label stock, its leading end is delivered to a vacuum drum 23 and, as it is transported by the drum to a container, it has adhesive applied to its leading end or to its trailing end, or to both its leading and trailing ends as described above, a glue pattern being applied as described above. The severed label with adhesive applied to it is delivered to a turret 25, which picks up containers 26 from an infeed star wheel 27. The turret picks up each container in its turn, spins it and transports it past the vacuum drum 23 where it contacts the leading end of a label on the vacuum drum. The vacuum is released at this point of contact so that the label is released and will adhere to and wrap around the container.

As described above, the label is elastic and it is stretched by reason of the fact that the vacuum drum has a peripheral speed exceeding that of the label stock as it is fed to the vacuum drum and the label is prevented from slipping by reason of the vacuum exerted by the vacuum drum 25 and/or by a clamping device as described above or by both such means.

Figure 3:
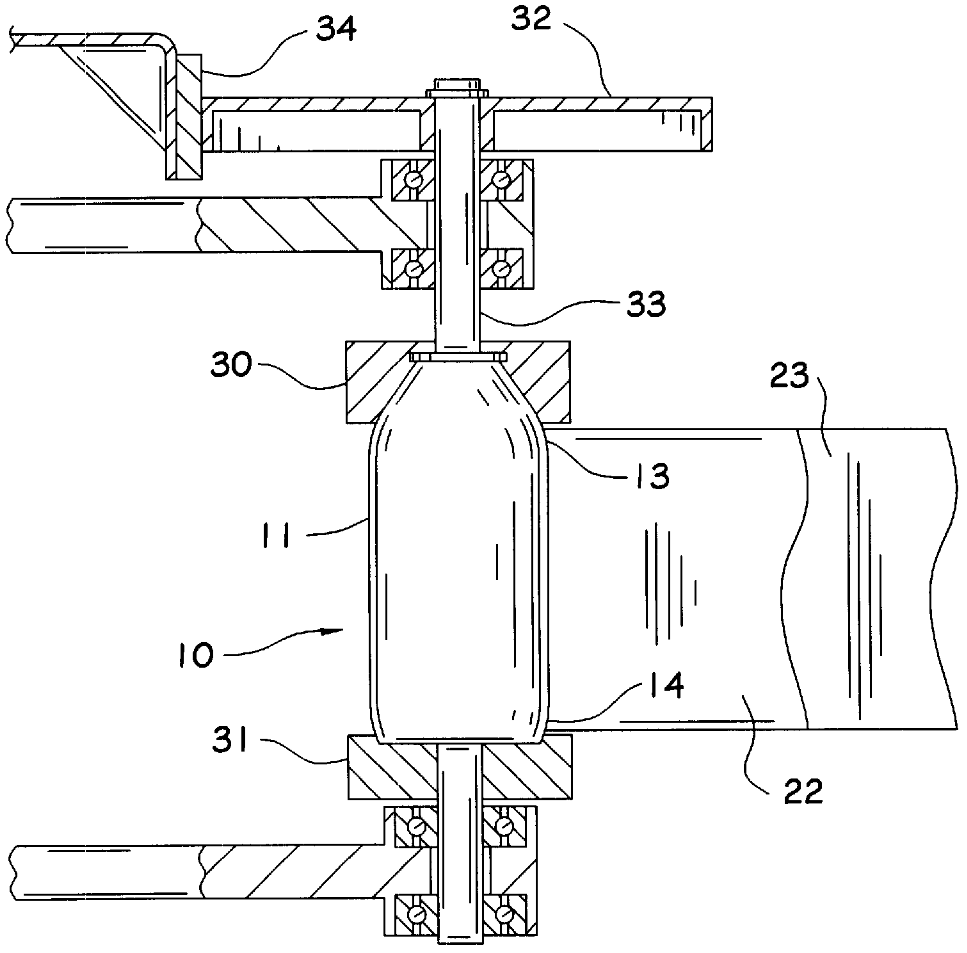
FIG. 3 is a section taken along line 3—3 of FIG. 2.

Referring now to FIG. 3, which is taken from FIG. 2 of U.S. Pat. No. 4,108,709 but is simplified and omits parts and employs different reference numerals, the turret has a number of pairs of chucks 30 and 31 which clamp a container between them. As the turret continues to rotate the upper chuck 30 is caused to spin by a wheel 32 and shaft 33, the wheel 32 being spun by contact with a pad 34 which has a circular arc centered on the axis of the turret. The leading end of the label contacts the container which is spinning and which is also moving about the axis of the turret and vacuum is released so that the label is free to adhere to and move with the container.

To prevent the stretched label from relaxing when it is released by the vacuum drum, adhesive on the label and/or the container acts to hold the label on the container in stretched condition. The composite speed of the periphery of the container is such that the label does not relax. Indeed this composite speed may be such that it stretches the label. The label is therefore applied to the container in stretched condition. The portion of the label overlying the shoulder 13 will, of course, relax and will conform to the shape of the shoulder and will fit it snugly. It will also relax and fit the sloping lower end 14 of the container.

Figure 4:
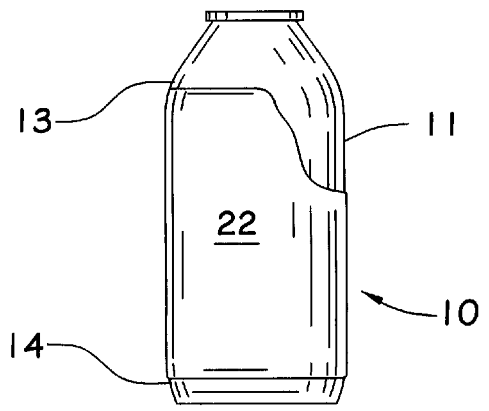
FIG. 4 is a view of the container of FIG. 1 with the label applied thereto.

Referring now to FIG. 4, a labeled container is there shown. The label is applied tightly both to the cylindrical body of the container, to the shoulder 13 and to the curved end portion 14.

Figure 5:
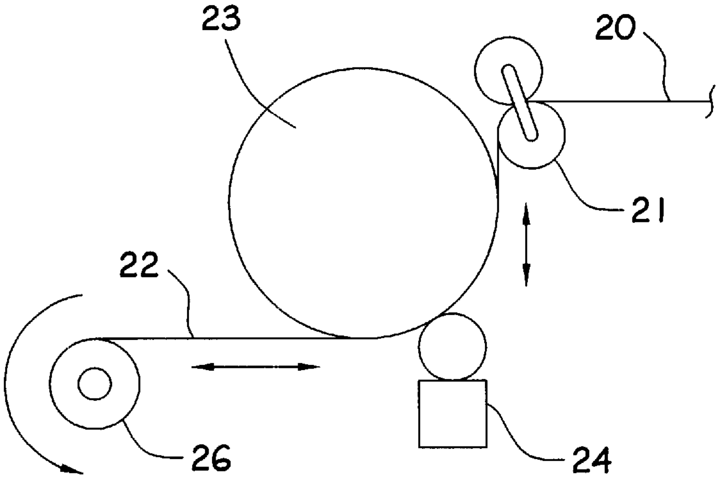
FIG. 5 is a diagrammatic illustration of the method of the invention.

Referring now to FIG. 5, the label cutter, the vacuum drum, the glue applicator, and a container are shown diagrammatically. The double headed arrows indicate the stretching of the label between the label feed and the vacuum drum and between the vacuum drum and the container.

Figure 6:
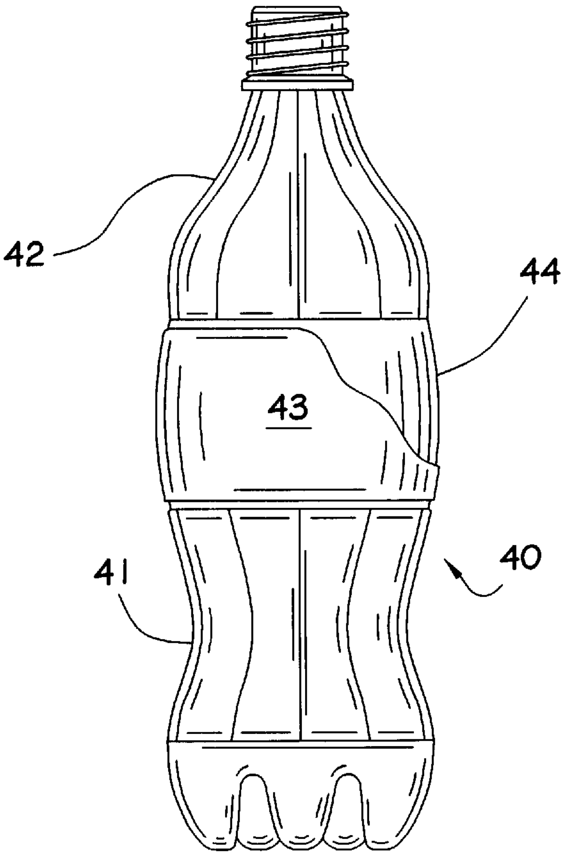
FIGS. 6 and 7 show alternative types of articles to which labels may be applied in accordance with the present invention.

Referring now to FIG. 6, the familiar cola bottle is shown at 40 which includes a lower portion 41, an upper portion 42 and a mid 44 to which a label 43 is applied in the manner described above. This mid-portion is convex having a midsection of maximum diameter and circumference above and below which are portions of lesser diameter and circumference. In U.S. Pat. No. 5,403,416 the labeling of such a container by heat shrink labeling is described. In according with the present invention a label is applied in stretched condition so that it fits the section of greatest diameter and relaxes to fix snugly onto the upper and lower portions of lesser diameter.

Figure 7:
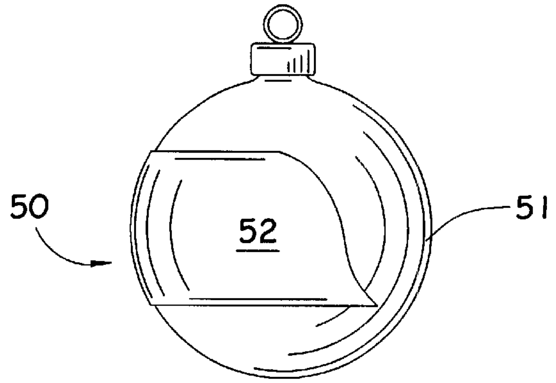

Referring to FIG. 7 a Christmas tree ornament is shown at 50 which has (in the perspective shown) a zone 51 of maximum diameter and circumference to which a segment 52 of decorative sheet material is applied in accordance with the present invention.

Figure 8:
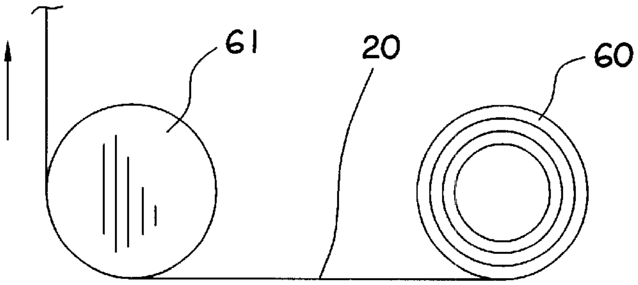
FIG. 8 shows another way of stretching the label.

Referring now to FIG. 8, a roll 60 of label stock is shown, such roll being driven by a motor (not shown) to feed label material 20 in the direction indicated by the arrow. The label material is partially wrapped around a roller 61 which rotates at a peripheral speed greater than the peripheral speed of the roll 60. Vacuum may be applied to the surface of the roller 61 to prevent slippage of the label material. As a result, the label material is stretched between the roll 60 and the roller 61. The roll 60 may be driven to impart to the label material leaving it to a constant speed as the roll diminishes in diameter.

The moving parts of the machine described above, such as the label feed, the cutter, the vacuum drum, the glue applicator, the turret and chucks, and the roll 61 in FIG. 8, may be operated by means of individual motors which are computer controlled, as for example in U.S. Pat. No, 5,380,381 or in Bright and Otruba U.S. patent application Ser. No. 08/122,857 filed Sep. 16, 1993, now U.S. Pat. No. 5,478,442.

Figure 9:
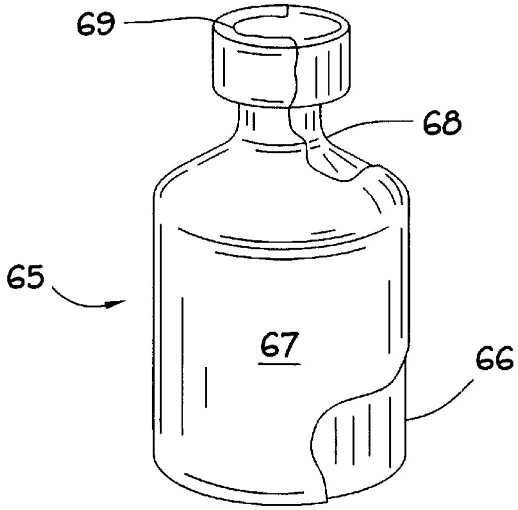
FIG. 9 is a view in elevation of a bottle having an elastic label applied to it which provides a tamper evident feature.

Referring now to FIG. 9, a bottle is shown at 65 having a body portion 66 to which a stretched label 67 has been applied. The bottle has a neck 68 and a stopper or cover 69. The label 67 is stretched to fit around the body portion 66 and it relaxes to fit the neck 68 and the stopper 69. The upper edge of the label may be heat shrunk to fit more tightly over the stopper. When the stopper is removed the label overlying it is broken and will reveal the fact that the bottle has been opened.

Among other advantages of applying elastic, stretch labels are the following: Elastic labels reduce breakage and fragmentation of containers. If a plastic container is filled with a carbonated beverage and is then sealed it will expand due to pressure of the carbonation and when it is emptied it will contract. In such a case the elastic label will expand and contract accordingly. An elastic label may be warmed before it is applied, thus allowing it to be stretched more easily.

The figures and verbal description above have been with respect to articles, each having a body portion of a maximum diameter with one or more portions adjacent thereto having a lesser diameter, for example, as in the case of containers having cylindrical body portions and at one end an inwardly tapering shoulder, or as in FIG. 7 having spherical bodies. The invention is also applicable to articles such as, for example, a cylindrical bottle or other container having on its cylindrical surface projecting portions to serve as decoration and which stand out from the cylindrical surface. Elastic segments, for example, transparent stretchable label material, may be applied over such projecting portions and onto the cylindrical body of the bottle. For example, the article may have a decorative projection. By the method of the invention, a transparent elastic label may be wrapped around the container in stretched condition so as to overlie but not conceal the projecting decoration. The applied label will shrink onto the surrounding cylindrical surface.

Similarly, an article may have a smooth body portion formed with decorative areas which are indented with respect to the smooth body portion. An elastic segment of sheet material may be applied in stretched condition to the body and it will relax and conform to the indented areas, it will therefore be apparent that a new and useful machine and a new and useful method have been provided for applying segments of sheet material, e.g. labels, to container and other articles.

What is claimed is:

1. A method of applying an elastic segment of sheet material having a leading end and a trailing end unattached to the leading end, to the surface of an article which presents a zone of maximum diameter or circumference and one or more adjacent areas of lesser diameter or circumference, said method comprising:

(1) stretching the segment to increase the distance between the leading and trailing ends, and (2) applying said segment to the article to overlie said zone of maximum diameter or circumference and said adjacent area or areas by adhering the leading end of the stretched segment to the article, moving said article at a surface speed greater than the speed of the transferred segment so as to stretch said segment during transfer, wrapping the segment in a stretched condition around said article so as to overlie said zone and said adjacent area or areas and securing the trailing end of the stretched segment to said leading end or directly to the article, the stretched segment being spaced from the areas of lesser diameter or circumference under said stretched segment, the stretching of said segment being sufficient that, when the applied stretching force is relinquished, the length of said segment between the leading and trailing ends of the portions of the segment overlying the lesser diameter areas will decrease and, upon relaxing, said segment will adhere closely and tightly to such areas or closely enough that the segment can then be heat shrunk onto such area or areas, and the portion of said segment overlying said zone of maximum diameter remains in a stretched condition.

2. The method of claim 1 wherein the article is a container and the segment is a label.

3. The method of claim 2 in which the segment is severed from a continuously moving length of sheet material which is deposited on the cylindrical surface of a continuously rotating vacuum drum and is rotated to a segment applying station at which each segment is released from the vacuum drum to a spinning article which wraps the segment about itself.

4. The method of claim 1 in which the segment is severed from a continuously moving length of sheet material which is deposited on the cylindrical surface of a continuously rotating vacuum drum and is rotated to a segment applying station at which each segment is released from the vacuum drum to a spinning article which wraps the segment about itself.

5. The method of claim 1 in which said applying step includes applying an adhesive to said trailing end of said segment, said adhesive being a fast-acting adhesive which substantially bonds said trailing end; to said leading end or directly to said article before the stretching force applied to said segment is relinquished.

6. A method of applying a segment of an elastic sheet material to the exterior surface of a noncylindrical article, said segment having a leading edge and a trailing edge, said container having a maximum diameter zone where said container has a maximum diameter and at least one lesser diameter zone where said container has a diameter less than said maximum diameter, said method comprising the steps of:

providing a segment of said elastic sheet material having a length between said leading edge and said trailing edge when said segment is in a relaxed condition which is no greater than the circumference of said maximum diameter zone of said container, applying the segment to said article with the segment overlying said maximum diameter zone and at least a portion of said lesser diameter zone by adhering said leading edge to said exterior surface, moving said article at a surface speed greater than the speed of the transferred segment so as to stretch said segment during transfer, wrapping the stretched segment around said article and securing said trailing edge to one of said leading edge and said exterior surface of said container, the stretched segment having a length between said trailing edge and said leading edge so that the segment is spaced from at least a portion of said lesser diameter zone under said segment when the stretched segment is applied to said maximum diameter zone of said article, and releasing the force retaining said segment in the stretched condition so that the portions of the stretched segment overlying said lesser diameter zone are allowed to relax to bring said segment closely and tightly against at least a portion of said lesser diameter zone of said article while the portion of the segment overlying said zone of maximum diameter remains in a stretched condition.

7. The method of claim 6 which said applying step includes adhering said trailing edge of the stretched segment to said leading edge of said stretched segment, and in which said applying step includes stretching said segment until the length between said leading edge and said trailing edge is greater than the circumference of said maximum diameter zone.

8. The method of claim 7 which said providing step includes providing a segment of said elastic material having a length between said leading edge and said trailing edge relative to the circumference of a portion of said lesser diameter zone so that after said releasing step, said segment is drawn against said portion of said lesser diameter zone of said container.

9. The method of claim 6 in which after said releasing step, said segment is spaced from a portion of said lesser diameter zone under said segment, and further comprising the step of applying heat to shrink said segment onto said portion of said lesser diameter zone under said segment.

10. The method of claim 6 wherein the article is a container and the segment is a label.

11. The method of claim 6 which said applying step includes applying an adhesive to said trailing edge of said segment, said adhesive being a fast-acting adhesive which substantially bonds said trailing edge to said leading edge or directly to said article before the force retaining said segment in a stretched condition is released.

12. A method of applying a segment of an elastic sheet material to the exterior surface of a noncylindrical article, said segment having a leading edge and a trailing edge, said container having a maximum diameter zone where said container has a maximum diameter and at least one lesser diameter zone where said container has a diameter less than said maximum diameter, said method comprising the steps of:

providing a segment of said elastic sheet material having a length between said leading edge and said trailing edge which is no greater than the circumference of said maximum diameter zone of said container, initially stretching the segment to increase the length between said leading edge and said trailing edge by applying said segment to the exterior surface of a rotating transfer drum, said segment being supplied to said transfer drum at a first speed and said transfer drum being rotated at a velocity such that said exterior surface moves at a second speed greater than said first speed to stretch said segment, applying the stretched segment to said article with the stretched segment overlying said maximum diameter zone and at least a portion of said lesser diameter zone by adhering said leading edge to said exterior surface, wrapping the stretched segment around said article and securing said trailing edge to one of said leading edge and said exterior surface of said container, said segment being further stretched by moving each article as a segment is applied to it at a surface speed greater than the speed of the transferred segment, the stretched segment having a length between said trailing edge and said leading edge so that the segment is spaced from at least a portion of said lesser diameter zone under said segment when the stretched segment is applied to said maximum diameter zone of said article, and releasing the force retaining said segment in the stretched condition so that the length of said segment between said leading edge and said trailing edge decreases to bring said segment closely and tightly against at least a portion of said lesser diameter zone of said article.

13. The method of claim 12 which said initial stretching step includes applying said segment to a vacuum drum.

14. The method of claim 12 in which said initial stretching step includes retaining said segment in the stretched condition by holding the stretched segment against said transfer drum by at least one of a vacuum and a clamping mechanism.

* * * * *

UNITED STATES PATENT AND TRADEMARK OFFICE

CERTIFICATE OF CORRECTION

PATENT NO. : 6,375,771 B1
DATED : April 23, 2002
INVENTOR(S) : Lyn E. Bright

It is certified that error appears in the above-identified patent and that said Letters Patent is hereby corrected as shown below:

Column 1,
Line 22, delete “of the leading” and replace with -- and the leading --
Line 62, delete “.” after the phrase “the sleeve over the”

Column 2,
Line 5, add -- of -- after “description”
Line 51, delete “as adhesive” and replace with -- an adhesive --

Column 3,
Line 20, delete “ro” and replace with -- or --
Line 20, delete “ro into” and replace with -- or into --

Column 4,
Line 60, insert -- portion -- after the phrase “and a mid”
Line 65, delete “according” and replace with -- accordance --

Column 5,
Line 17, replace “leaving it to” with -- leaving it at --
Line 67, replace “areas, it” with -- areas. It --

Column 6,
Line 38, replace “claim 2” with -- claim 1 --

Column 7,
Line 33, replace “claim 7 which” with -- claim 7 in which --

Signed and Sealed this

Twenty-fourth Day of December, 2002

JAMES E. ROGAN
*Director of the United States Patent and Trademark Office*